Figure 1:
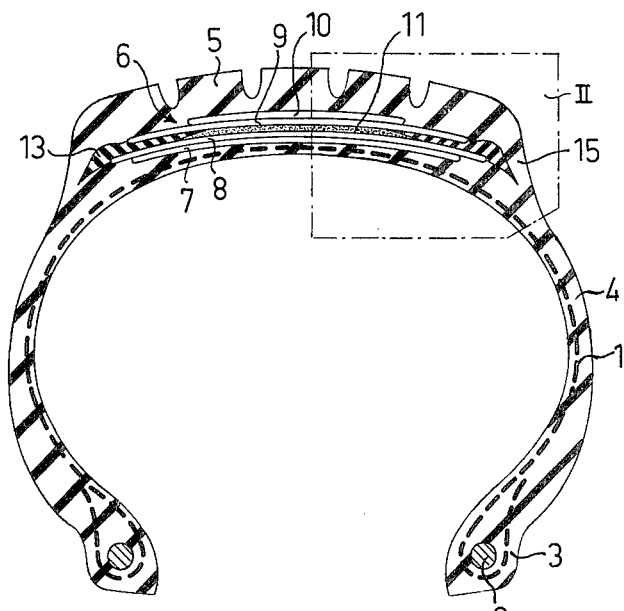

United States Patent [19]

Rohde et al.

[11] 4,425,953
[45] Jan. 17, 1984

[54] PNEUMATIC VEHICLE TIRE HAVING A RUBBER LAYER BETWEEN BELT PLIES

[75] Inventors: Dieter Rohde, Lehrte; Siegfried Preatorius, Barsinghausen, both of Fed. Rep. of Germany

[73] Assignee: Continental Gummi-Werke Aktiengesellschaft, Hanover, Fed. Rep. of Germany

[21] Appl. No.: 347,254

[22] Filed: Feb. 9, 1982

[30] Foreign Application Priority Data

Feb. 13, 1981 [DE] Fed. Rep. of Germany ....... 3105209

[51] Int. Cl.³ .............................................. B60C 9/20
[52] U.S. Cl. ................................ 152/360; 152/361 R; 152/374
[58] Field of Search ............. 152/360, 361 R, 361 FP, 152/361 DM, 374

[56] References Cited

U.S. PATENT DOCUMENTS

| 3,516,465 | 6/1970 | Guyot ................................. | 152/360 |
| 3,678,982 | 7/1972 | Watanabe et al. .......... | 152/361 DM |
| 4,349,061 | 9/1982 | Hirakawa et al. .................. | 152/360 |

FOREIGN PATENT DOCUMENTS

| 1290231 | 3/1962 | France ............................. | 152/361 R |
| 2298448 | 8/1976 | France ............................. | 152/361 R |

*Primary Examiner*—Lois E. Boland
*Attorney, Agent, or Firm*—Becker & Becker

[57] ABSTRACT

A pneumatic vehicle tire of elastomeric material has a radial carcass and a pull-resistant belt which is located between the carcass and the tread, and extends approximately over the width of the tread. The belt includes at least two cord fabric plies. A rubber layer is arranged at least partially between two of these plies and has a thickness in a range from the diameter of the cords of the belts to 5 mm. Furthermore, in the central region of the belt, the rubber layer located between the belt plies is considerably softer than are those portions of the rubber layer located in the vicinity of the two edge regions of the belt. The two harder portions of the rubber layer, which harder portions are arranged laterally of the softer central portion, project beyond the belt on both sides.

14 Claims, 2 Drawing Figures

PNEUMATIC VEHICLE TIRE HAVING A RUBBER LAYER BETWEEN BELT PLIES

The present invention relates to a pneumatic vehicle tire which essentially comprises rubber or rubber-like material. The tire has a radial carcass and a pull-resistant belt which is located between the carcass and the tread, and which extends approximately over the width of the tread. The belt comprises two or more cord fabric plies, preferably steel strand cord fabric plies. A rubber layer is arranged at least between two belt plies and the thickness thereof corresponds at least approximately to the diameter of the strength carriers of the belt, though not exceeding a thickness of 5 mm. Furthermore, in the central region of the belt, the rubber layer located between the belt plies is considerably softer than are those portions of the rubber layer located in the two edge regions of the belt.

With known pneumatic tires of this type, the rubber layer, which to a certain extent comprises three strips arranged side by side, is approximately crescent-shaped or is provided with tapered edges, such that the freely ending edges on both sides of the belt terminate therewith.

Although such an intermediate rubber layer brings about a reduction of the rolling friction or resistance to rolling of the tire, ply separations in the region of the edges of the belt cannot be avoided.

An object of the present invention is to improve the fatigue limit of the zenith portion of the tire via an improved cohesion of its plies and layers, while at the same time still further reducing the rolling friction or decreasing the resistance to rolling ever more.

Figure 2:
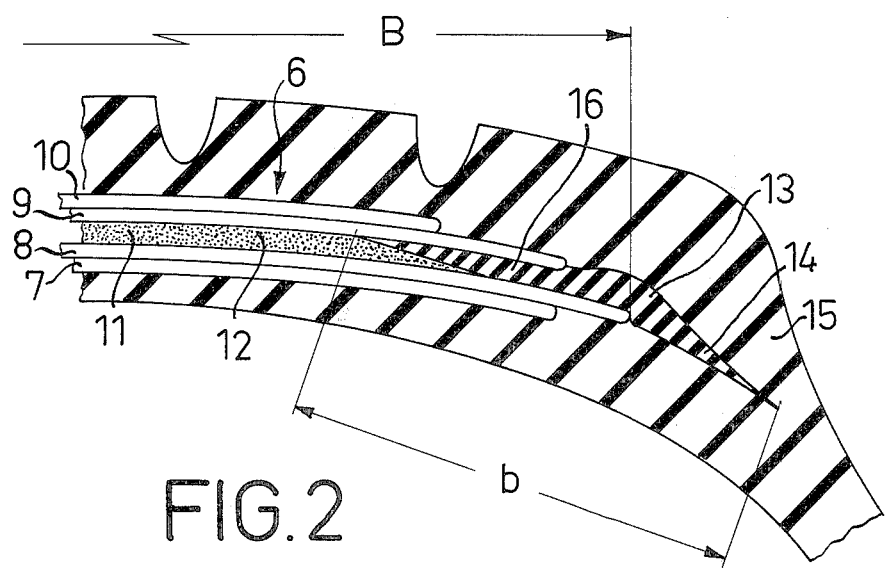

This object, and other objects and advantages of the present invention, will appear more clearly from the following specification in connection with the accompanying drawing, in which:

FIG. 1 shows a radial partial section taken through one embodiment of the invention pneumatic vehicle tire; and FIG. 2 shows an enlarged partial section taken through the shoulder portion in a region II of the tire of FIG. 1.

The object of the present invention is fulfilled primarily in that the two harder portions of the rubber layer in the tire are arranged laterally of the softer central portion thereof and the two harder portions project beyond the belt on both sides. In particular, it is expedient to locate approximately half of the width of the strips directly within the belt connection structure, while locating the other half of the width of the strips laterally outwardly next to the belt connection structure.

These laterally projecting portions of the abovementioned harder rubber strips improve the bonding between the edges of the belt and the adjoining rubber layers. Moreover, the lateral projections still further reduce the rolling friction or resistance to rolling of the tire even more, because the zenith portion of the tire as a whole is further strengthened and stabilized. This is particularly apparent under the influence of lateral forces.

In order to provide a transition which favors stability, the two laterally arranged hard strips of the aforementioned rubber layer should have an approximately triangular cross section, or a cross section with which the thicknesses gradually taper toward the two edges of the strips, possibly to sharp edges. A much better transition is achieved in this way, in contrast to that of rectangular cross sections.

According to other specific features of the present invention, the underside or radially inner side of the strips rests on the end face of that ply of the belt located beneath or radially inward of the strip.

With a triangular strip, the longer side faces that ply of the belt located below or radially inward of the strip. The width of the strip may be approximately 20 to 25% of the width of the belt. The width of a freely projecting portion or leg of the strip amounts to approximately 10% of the width of the belt.

The hardness of the strips may be approximately 58 to 80 Shore A, and the hardness of the central strip of the rubber layer located between these strips may be approximately 40 to 50 Shore A. The hardness of the strips may be about 5 to 10 Shore A greater than the hardness of the adjacent rubber layers of the tire shoulder.

The inner leg of the rubber strip, which leg is located between belt plies, essentially rests against the radially outer ply. The inner leg of the rubber strip tapers towards the middle of the belt.

Referring now to the views of the drawing in detail, the tire body, which essentially comprises rubber or rubber-like material, has a radial carcass 1, the strength carrier or cord of which is anchored in the bead regions 3 by being looped around the bead cores 2. Above the tire sidewalls 4, and between the radial carcass 1 and the profiled tread 5, there is located a belt 6 which is pull resistant in the circumferential direction and extends essentially over the width of the tread 5. In the embodiment shown, the belt 6 comprises four superimposed cord fabric plies 7,8,9, and 10, with the strength carriers or cords of the plies 7, 8, or 9,10 respectively crossing one another; the strength carriers form angles of approximately 18° to 25° with the circumferential direction of the tire. The width of the plies varies; the plies 8,9, which have the greatest width, are kept equidistant from one another by means of a rubber layer 11, or are elastically and flexibly connected with one another via this adhesively applied rubber layer 11 being free of any reinforcing cords.

The rubber layer 11 comprises a central strip 12 and two side strips 13; the width b of the strips 13 amounts to approximately 20 to 25% of the width B of the belt 6. Each of the strips 13 has an approximately triangular cross section, with one leg 14 of the triangular cross section not only resting on the end face of the ply 8, but also projecting beyond the belt 6 toward the shoulder 15 of the tire. Most of the other leg 16 of the triangular cross section is located between the two plies 8 and 9. The projecting portion, i.e. the length of the leg 14, amounts to approximately 10% of the width B.

The hardness (all hardnesses are measured in Shore A) of the layer or strip 12 is approximately 40 to 50, preferably approximately 48 Shore. The hardness of the strips 13, on the other hand, is considerably greater. This hardness is approximately 58 to 80, preferably approximately 65 to 70 Shore. The rubber layers located in the shoulder and adjacent to and in contact with the leg 14 have a Shore hardness which is about 5 to 15 Shore degrees less, i.e. they have a hardness of approximately 55 to 60 Shore, although the tread 5 can have a hardness of approximately 63 to 65 Shore. In all cases, however, the strips 13 should be harder than the adjoining rubber layers.

The strips 13 with their laterally projecting legs 14 bring about an improvement of the transition of the lateral edges of the belt 6 into the shoulder region of the tire. At the same time, a better increase in the strength and rigidity of the zenith portion of the tire, and hence also a reduction of the rolling friction, is achieved.

As shown in the drawing, the plies 8,9 extend practically parallel to one another.

The rebound elasticity (determined according to DIN-German Industrial Norm-No. 53512) is also of considerable significance for practicing the present invention. Particularly favorable results are obtained if the layer or strip 12 has a rebound elasticity of 60 to 70%, the strips 13 have a rebound elasticity of 40 to 50%, and finally the tread 5 has a rebound elasticity of 40%. The rubber layers adjoining the leg 14 of the strip 13 correspondingly have a rebound elasticity which is approximately 10 to 30% higher.

The embodiment shown in the drawing comprises a belt 6 having four cord fabric plies 7,8,9 and 10. As already indicated, the strength carriers or cords of the plies 7,8 or 9,10 form angles of approximately 18° to 25° with the circumferential direction of the tire in such a way that two superimposed pairs of plies of symmetrical rhombic arrangement result. The central strip 12 is arranged between the plies 8 and 9, which in turn form the aforementioned inclined angle with the circumferential direction of the tire.

The invention is, however, also applicable to those belts in which, in contrast to the normal rhombic arrangement, the strength carriers form triangles with one another. For example, the strength carriers of two plies form angles of approximately 18° to 25° with the circumferential direction, while a third ply assumes an angle of approximately 65° to the circumferential direction of the tire. For this case of the so-called triangular belt, the central strip 12 is arranged between two plies, the strength carriers of which describe the smaller angle, i.e. an angle of approximately 18° to 25°, with the circumferential direction of the tire. Thus, the strength carriers which have the larger angle are not adjacent to the rubber strips 12.

Also significant is the fact that the inner leg 16 of the strip 13, which leg 16 is directed away from the leg 14, at least predominantly does not contact the radially inner ply 8, but rather contacts the radially outer ply 9, or is adhesively connected to this ply. This is of great significance because the shearing stresses which occur during operation of the tire can best be countered with such a placement and arrangement of the rubber strip 13.

The present invention is, of course, in no way restricted to the specific disclosure of the specification and drawing, but also encompasses any modifications within the scope of the appended claims.

What we claim is:

1. A pneumatic vehicle tire comprised primarily of elastomeric material and having a radial carcass, sidewalls, a tread, and a pull resistant belt having edges associated therewith and being located between said carcass and said tread, said belt extending approximately over the width of said tread and including at least two cord fabric plies, the cords of which have a given diameter; said tire further comprising a rubber layer arranged at least partially between two of said plies and having a thickness of from said given cord diameter to 5 mm, said rubber layer being free of any reinforcing cords and including a central strip located entirely between said two belt plies, and two side strips having a predetermined hardness and having a radially inner side thereof respectively, one on each side of and adjoining said central strip, said side strips respectively having a width relative to said belt and projecting partially laterally beyond the associated edges of said belt, the projecting portion of said side strips having a width that is approximately 10% of the belt width, said central strip of said rubber layer being considerably softer than said side strips thereof.

2. A pneumatic vehicle tire comprised primarily of elastomeric material and having a radial carcass, sidewalls including portions having rubber layers adjacent to side strips, as herein defined, a tread, and a pull resistant belt having edges associated therewith and being located between said carcass and said tread, said belt extending approximately over the width of said tread and including at least two cord fabric plies radially superimposed upon one another, the cords of which have a given diameter; said tire further comprising a rubber layer arranged at least partially between two of said plies and having a thickness of from said given cord diameter to 5 mm, said rubber layer including a central strip located entirely between said two belt plies, and two side strips having a predetermined hardness and having a radially inner side thereof respectively, one on each side of and adjoining said central strip, said side strips respectively having a width relative to said belt and projecting partially laterally beyond the associated edges of said belt, said central strip of said rubber layer being considerably softer than said side strips thereof, approximately half of the width of each of said side strips of said rubber layer being arranged as a portion with a thickness between said two belt plies, with the other half of the width of each of said side strips as a portion with a thickness projecting laterally beyond the associated edges of said belt.

3. A tire according to claim 2, in which the thickness of that portion of each of said side strips which projects laterally beyond said belt becomes less as viewed in the direction from said central strip toward its associated sidewall.

4. A tire according to claim 3, in which the thickness of each of said side strips becomes less towards its edges.

5. A tire according to claim 4, in which said side strips terminate in a point of taper.

6. A tire according to claim 3, in which the radially inner side of a given side strip abuts the end face of the adjoining, radially inwardly located, ply of said belt.

7. A tire according to claim 4, in which each of said side strips has an essentially triangular cross section including a longer side thereof.

8. A tire according to claim 7, in which the longer side of a given side strip of essentially triangular cross section faces the radially inwardly located ply of said belt.

9. A tire according to claim 8, in which the width of a given side strip is approximately 20 to 25% of the width of said belt.

10. A tire according to claim 9, in which the width of that portion of a given side strip which projects laterally beyond said belt is approximately 10% of the width of said belt.

11. A tire according to claim 10, in which the hardness of said side strips is approximately 58 to 80 Shore A, and the hardness of said central strip located therebetween is approximately 40 to 50 Shore A.

12. A tire according to claim 11, in which the hardness of said side strips is approximately 5 to 10 Shore A greater than the hardness of the rubber layers of those portions of said sidewalls adjacent to said side strips.

13. A tire according to claim 2, in which that portion of a given side strip which is arranged between said two belt plies essentially abuts the radially outwardly located one of said two belt plies.

14. A tire according to claim 13, in which that portion of a given side strip which is arranged between said two belt plies terminates in a point and tapers in the direction toward said central strip.

* * * * *